US008561526B2

(12) United States Patent  
Zhang et al.

(10) Patent No.: US 8,561,526 B2  
(45) Date of Patent: Oct. 22, 2013

(54) BREAD-TOASTER

(75) Inventors: George Mohan Zhang, Guangdong (CN); Bei Zhang, Guangdong (CN); Huajin Chen, Guangdong (CN); Faxi Huang, Guangdong (CN)

(73) Assignee: Crastal Technology (Shenzhen) Co., Ltd., Shenzhen, Guangdong (CN)

( * ) Notice: Subject to any disclaimer, the term of this patent is extended or adjusted under 35 U.S.C. 154(b) by 154 days.

(21) Appl. No.: 12/998,244

(22) PCT Filed: Mar. 26, 2009

(86) PCT No.: PCT/CN2009/071027
§ 371 (c)(1),
(2), (4) Date: Mar. 28, 2011

(87) PCT Pub. No.: WO2010/048800
PCT Pub. Date: May 6, 2010

(65) Prior Publication Data
US 2011/0185918 A1    Aug. 4, 2011

(30) Foreign Application Priority Data

Oct. 31, 2008  (CN) .......................... 2008 1 0217156

(51) Int. Cl.
*A47J 37/08* (2006.01)
(52) U.S. Cl.
USPC ................... 99/391; 99/385; 99/386; 99/389; 99/393; 99/390; 99/392; 219/386; 219/411; 219/392
(58) Field of Classification Search
USPC ........... 99/391, 385, 386, 389, 393, 390, 392; 219/386, 411, 392
See application file for complete search history.

(56) References Cited

U.S. PATENT DOCUMENTS

| | | | | |
|---|---|---|---|---|
| 2,042,226 A | * | 5/1936 | Harpster | 99/388 |
| 2,566,905 A | * | 9/1951 | Palmer | 99/329 R |
| 2,788,734 A | * | 4/1957 | Weeks | 99/390 |
| 2,818,011 A | * | 12/1957 | Fleming et al. | 99/329 R |
| 3,074,342 A | * | 1/1963 | Wachtel | 99/339 |
| 3,169,469 A | * | 2/1965 | Parr | 99/400 |
| 3,558,855 A | * | 1/1971 | Stanek et al. | 219/385 |
| 3,760,713 A | * | 9/1973 | Sato | 99/391 |
| 3,789,749 A | * | 2/1974 | Paaskesen | 99/391 |
| 4,216,372 A | * | 8/1980 | Huggler | 219/521 |
| 4,345,513 A | * | 8/1982 | Holt | 99/327 |
| 4,404,899 A | * | 9/1983 | Weiss | 99/332 |
| 4,487,115 A | * | 12/1984 | Su | 99/327 |
| 5,423,246 A | * | 6/1995 | McNair et al. | 99/334 |
| 5,423,426 A | * | 6/1995 | Harper | 206/545 |
| 5,458,052 A | * | 10/1995 | McNair et al. | 99/385 |
| 5,528,980 A | * | 6/1996 | McClean | 99/389 |
| 5,642,657 A | * | 7/1997 | Yeung et al. | 99/334 |

(Continued)

*Primary Examiner* — Joseph M Pelham
*Assistant Examiner* — Jimmy Chou
(74) *Attorney, Agent, or Firm* — Raymond Y. Chan; David and Raymond Patent Firm

(57) ABSTRACT

A bread toaster includes an outer cover, a toaster base, a toaster frame mounted on the toaster base, a first sliding member slidably provided on a predetermined side of the toaster frame, a second sliding member also provided on the same predetermined side of the toaster frame, a front supporting frame and a rear supporting frame provided at a front side and a rear side of the toaster frame respectively, a lid arrangement, and a control circuitry, wherein the lid arrangement is arranged to be operated between a closed position and an opened position for closing and opening the toasting slots of the bread toaster.

10 Claims, 12 Drawing Sheets

(56) References Cited

U.S. PATENT DOCUMENTS

| | | | |
|---|---|---|---|
| 5,647,270 A * | 7/1997 | Rousseau et al. | 99/327 |
| 5,653,158 A * | 8/1997 | Balandier et al. | 99/327 |
| 5,901,638 A * | 5/1999 | Houel | 99/327 |
| 5,924,355 A * | 7/1999 | Belknap et al. | 99/389 |
| 5,970,851 A * | 10/1999 | Masel et al. | 99/334 |
| 6,105,486 A * | 8/2000 | Belknap et al. | 99/389 |
| 6,205,910 B1 * | 3/2001 | Vaughn | 99/326 |
| 6,230,611 B1 * | 5/2001 | Mauffrey | 99/327 |
| 6,244,166 B1 * | 6/2001 | Lebron | 99/342 |
| 6,267,044 B1 * | 7/2001 | Friel, Sr. | 99/327 |
| 6,298,772 B1 * | 10/2001 | Nguyen et al. | 99/327 |
| 6,305,273 B1 * | 10/2001 | Sherman | 99/393 |
| 6,530,309 B2 * | 3/2003 | Van Der Meer et al. | 99/331 |
| 6,539,840 B2 * | 4/2003 | Choi et al. | 99/331 |
| 6,584,889 B2 * | 7/2003 | Friel, Sr. | 99/327 |
| 6,667,465 B2 * | 12/2003 | Garber et al. | 219/413 |
| 6,686,564 B2 * | 2/2004 | Zhou | 219/386 |
| 6,864,470 B2 * | 3/2005 | Back | 219/685 |
| 6,930,295 B2 * | 8/2005 | Kim | 219/685 |
| 7,013,798 B2 * | 3/2006 | Arnedo et al. | 99/326 |
| 7,041,948 B2 * | 5/2006 | Lee et al. | 219/680 |
| 7,170,039 B2 * | 1/2007 | Lee et al. | 219/680 |
| 7,189,945 B2 * | 3/2007 | Starr et al. | 219/392 |
| 7,467,583 B2 * | 12/2008 | Lam | 99/327 |
| 7,600,468 B2 * | 10/2009 | Zhang et al. | 99/327 |
| 8,015,916 B2 * | 9/2011 | Pan | 99/388 |
| 2002/0104444 A1 * | 8/2002 | Van Der Meer et al. | 99/327 |
| 2003/0075052 A1 * | 4/2003 | Saunders et al. | 99/327 |
| 2003/0116031 A1 * | 6/2003 | Choi et al. | 99/357 |
| 2003/0168438 A1 * | 9/2003 | Zhou | 219/386 |
| 2004/0211324 A1 * | 10/2004 | Wanat | 99/385 |
| 2005/0109218 A1 * | 5/2005 | Arnedo et al. | 99/391 |
| 2005/0204927 A1 * | 9/2005 | Boyle et al. | 99/389 |
| 2005/0229790 A1 * | 10/2005 | De'Longhi | 99/389 |
| 2006/0162573 A1 * | 7/2006 | Yip | 99/389 |
| 2008/0087174 A1 * | 4/2008 | Barnes et al. | 99/389 |
| 2009/0064870 A1 * | 3/2009 | Pan | 99/391 |
| 2011/0179953 A1 * | 7/2011 | Glucksman et al. | 99/385 |

* cited by examiner

BREAD-TOASTER

BACKGROUND OF THE PRESENT INVENTION

1. Field of Invention

The present invention relates to a bread toaster, and more particularly to a bread toaster comprising a lid arrangement.

2. Description of Related Arts

A conventional bread toaster usually comprises a toaster casing, a toaster base, an electronic timer, and a toasting rack which is movably mounted in the toaster casing and defines two toasting slots, a handle coupled with the toasting rack, and a plurality of heating elements received in the toaster casing. Its primary function is to toast at least one bread slice for a predetermined period of time preset by the timer. Conventionally, the bread toaster has a plurality of elongated openings formed on a top side of the toaster casing and aligned with the two toasting slots respectively. The operation of the convention bread toaster is as follows: a user may connect the bread toaster to an external electricity source and put two bread slices into the two toasting slots through the elongated openings respectively. When the bread slices are received in the toasting slots, the user may downwardly depress the handle so as to move the toasting rack downwardly. The heating element is then activated for a time period determined by the electronic timer so as to toast the bread slices for the corresponding period of time. The major disadvantage of this type of conventional bread toaster is that the elongated openings face upwardly which make dusts and dirt enter the toasting slots very easily. Moreover, since the elongated openings are the major channels communicating the toasting slots and an exterior of the bread toaster, when the toaster is operating, heat generated in the toasting slots will dissipate very rapidly through the elongated openings, making the bread toaster to be very inefficient. One further problem is that due to the existence of the elongated openings, heat distribution along a vertical direction of the toasting slots is very uneven, making uneven toasting performance on the part of the bread toaster.

SUMMARY OF THE PRESENT INVENTION

The invention is advantageous in that it provides a bread toaster which comprises a lid arrangement, wherein a lid actuation handle and a toaster actuation handle are independently provided at one side of a toaster frame so that a user is able to freely control any one of the lid actuation handle and the toaster actuation handle for accomplishing optimal toasting performance of the bread toaster.

According to the present invention, the foregoing and other objects and advantages are attained by providing a bread toaster, comprising an outer cover, a toaster base, a toaster frame mounted on the toaster base, a first sliding member slidably provided on a predetermined side of the toaster frame, a second sliding member also provided on the same predetermined side of the toaster frame, a front supporting frame and a rear supporting frame provided at a front side and a rear side of the toaster frame respectively, a lid arrangement, and a control circuitry, wherein the lid arrangement is arranged to be operated between a closed position and an opened position for closing and opening the toasting slots of the bread toaster.

Moreover, the second sliding member further has a second upper sliding connector and a second lower sliding connector provided at an upper and a lower portion thereof respectively, wherein each of the second upper sliding connector and the second lower sliding connector has a through hole formed thereon for connecting with the first sliding guider.

The first sliding member further has a first lower sliding connector having a connector hole and a first upper connector having a connector hole, wherein the first lower sliding connector and the first upper sliding connector are slidably coupled to the first sliding guider, wherein the first lower sliding connector and the first upper sliding connector are positioned below the second lower sliding connector and the second upper sliding connector of the second sliding member respectively.

The bread toaster further comprises a first sliding guider and a second sliding guider mounted on the toaster frame, wherein the first sliding member is slidably connected to the first and the second sliding guider, wherein the first sliding member further has a first lower sliding connector having a connector hole, wherein the first sliding member further has a first upper connector having a connector hole, wherein the second sliding guider is arranged to connect with the first sliding member.

The bread toaster further comprises a toasting frame provided on the toaster frame, wherein the toaster frame has a toasting slot wherein the toasting frame communicates with the toasting slot.

The bread toaster further comprises a third sliding member communicated with the first sliding member for operating the lid arrangement, and a toasting frame mounted on the third sliding member for moving the bread slice in the toasting slots.

The third sliding member further has a third upper connector having a connector hole, wherein the second sliding guider is arranged to extend on the toaster frame to penetrate a connector hole of the first sliding member and the connector hole of the third sliding guider.

The first sliding member is capable of sliding along the first and the second sliding guider, wherein the second sliding member is capable of sliding along the first sliding guider, while the third sliding member is capable of slidably engaging with a sliding slot of the first sliding member through a plurality of securing members.

The bread toaster further comprises a holding member provided on the first sliding member, a first biasing member provided on the first sliding member, wherein the first inductive device comprises a first electromagnetic member, wherein the first electromagnetic member and the first biasing member are aligned with each other.

The bread toaster further comprises a power switch, a hanger frame, a second biasing member, a toaster actuation handle, a first and a second driving member mounted on the toaster frame, a second inductive device, a second electromagnetic member mounted on the toaster frame and is aligned with the hanger frame, wherein the second biasing member is positioned above the power switch and is aligned with it.

The bread toaster further comprises a hanger frame, an electromagnetic frame having an electromagnetic member, a second inductive device aligned with the electromagnetic member, wherein the second sliding member is communicated with the electromagnetic frame.

Each of the first and the second driving member has a corresponding upper end portion outwardly bent at a predetermined inclination, wherein the bread toaster further comprises a first and a second front guiding frame having inwardly bent end portions respectively, wherein the first and the second driving member are arranged to couple with the corresponding inwardly bent end portion of the first and the second front guiding frame respectively.

The lid arrangement comprises a first and a second front guiding frame pivotally mounted on the front supporting frame, and a first and a second lid member, wherein each of the first and the second driving member has a driving hole formed thereon respectively, wherein the lid arrangement further comprises a first and a second pivotal member each having an end portion, and a plurality of elastic member extended between the end portions of the first and the second pivotal member and the first and the second lid member respectively.

Each of the first sliding guider and the second sliding guider comprises a shaft.

As compared with conventional bread toasters, the bread toaster of the present invention provides a lid arrangement for allowing a user to toast bread slice with or without the lid arrangement. Moreover, the operation of the lid arrangement and the toasting frame can be independently operated so as to bring great convenience to the user. Furthermore, when the toaster frame is accidentally stuck in the toaster frame, the heating element is deactivated so as to ensure the maximum safety of the present invention. The bread toaster of the present invention also provides a hygienic and energy efficient product of toasting bread slices.

DETAILED DESCRIPTION OF THE PREFERRED EMBODIMENT

Figure 1:
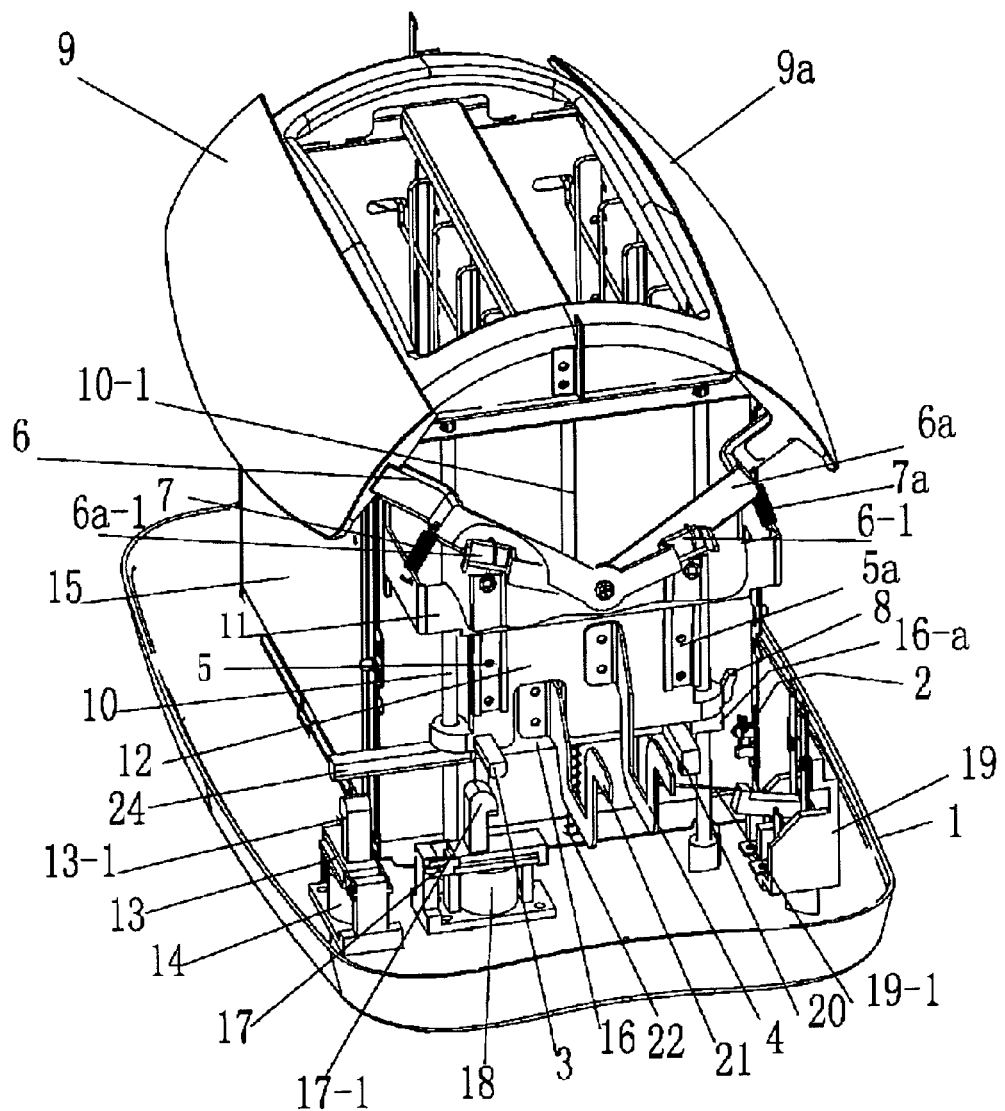
FIG. 1 is a perspective view of a bread toaster according to a first preferred embodiment of the present invention.
Figure 2:
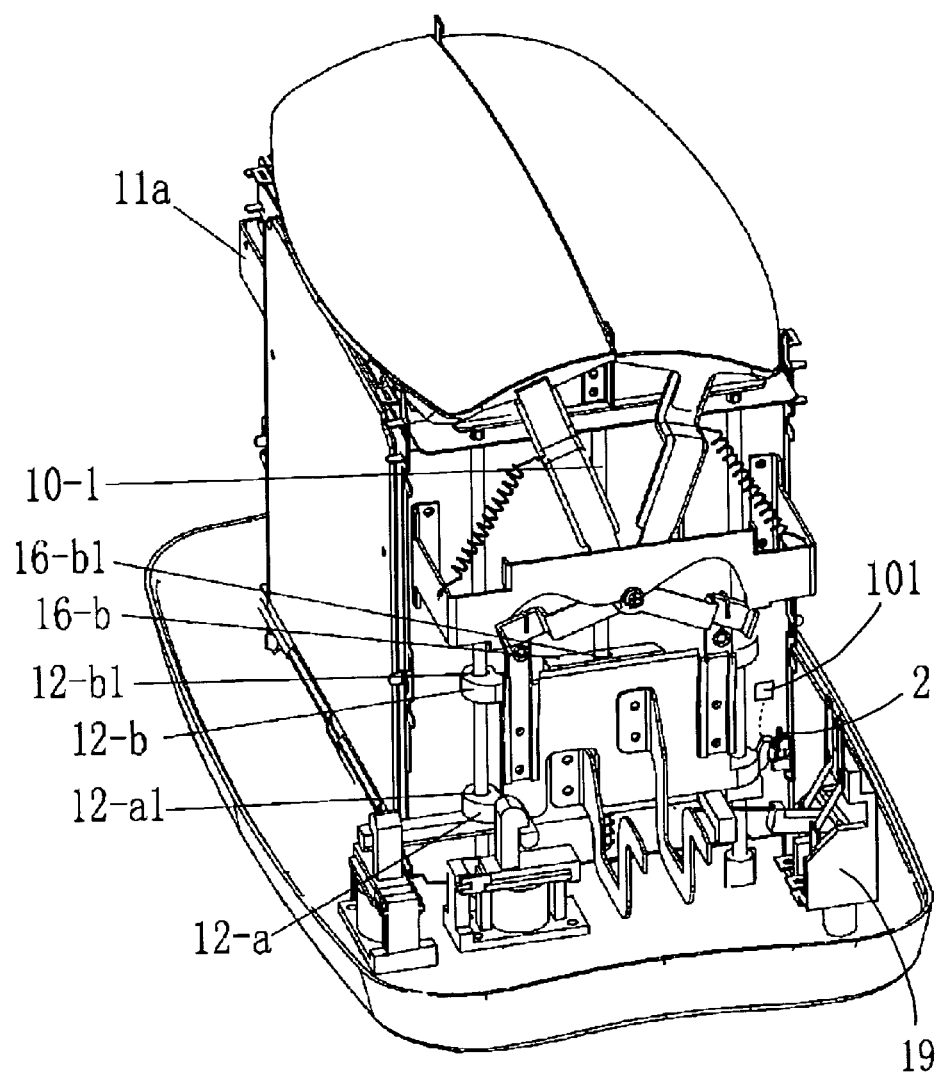
FIG. 2 is a first schematic diagram of the bread toaster according to the above first preferred embodiment of the present invention.
Figure 3:
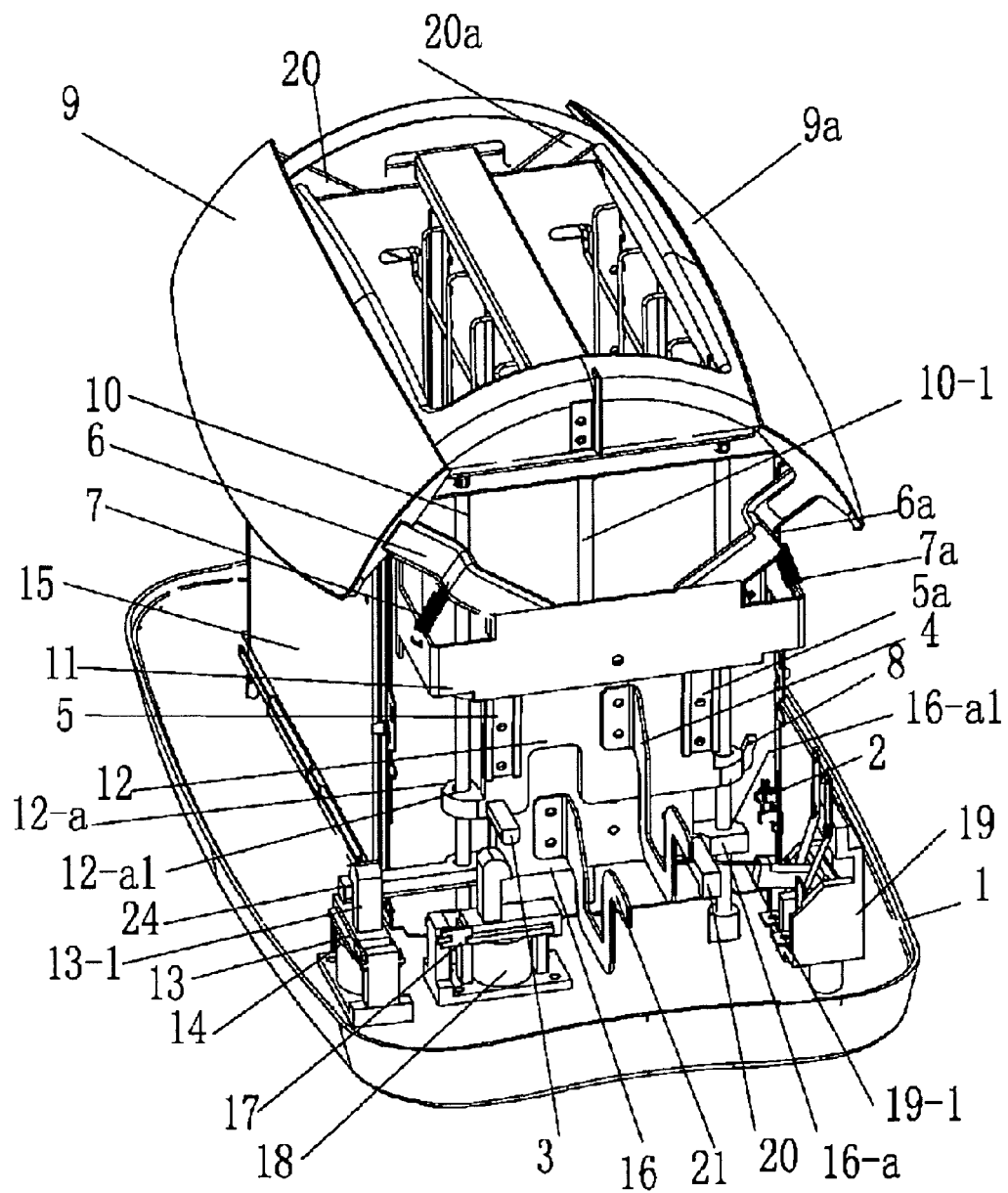
FIG. 3 is a second schematic diagram of the bread toaster according to the above first preferred embodiment of the present invention.
Figure 4:
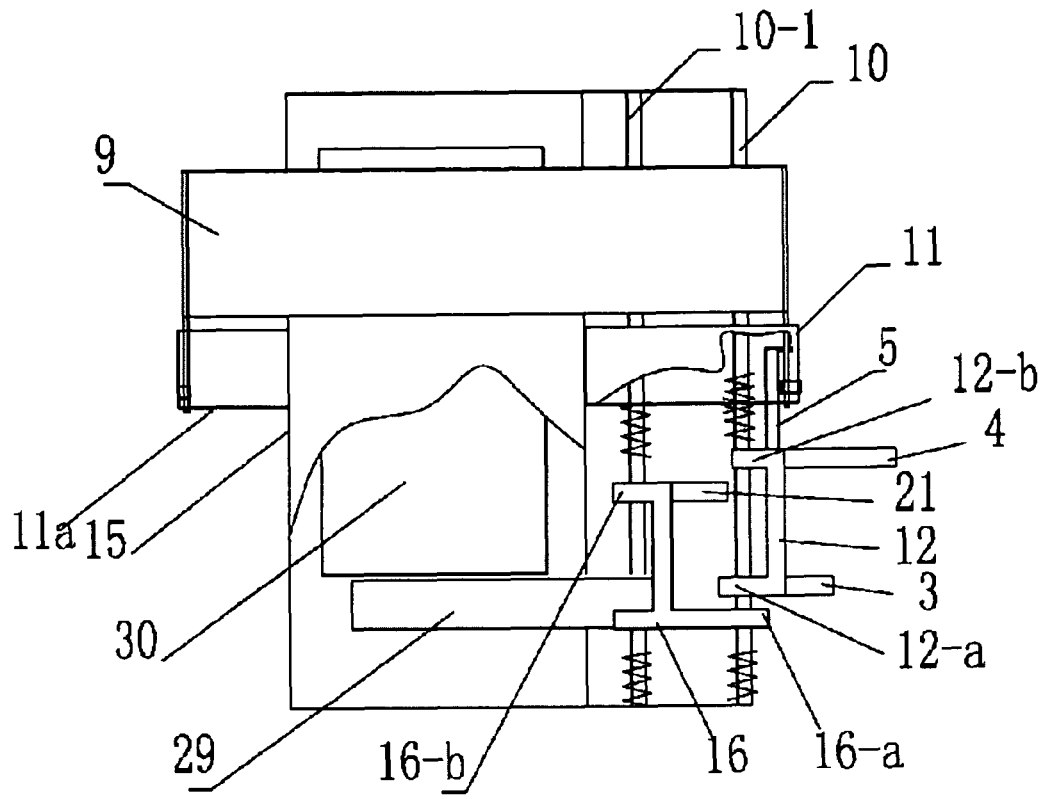
FIG. 4 is a side view of the bread toaster according to the above first preferred embodiment of the present invention.
Figure 5:
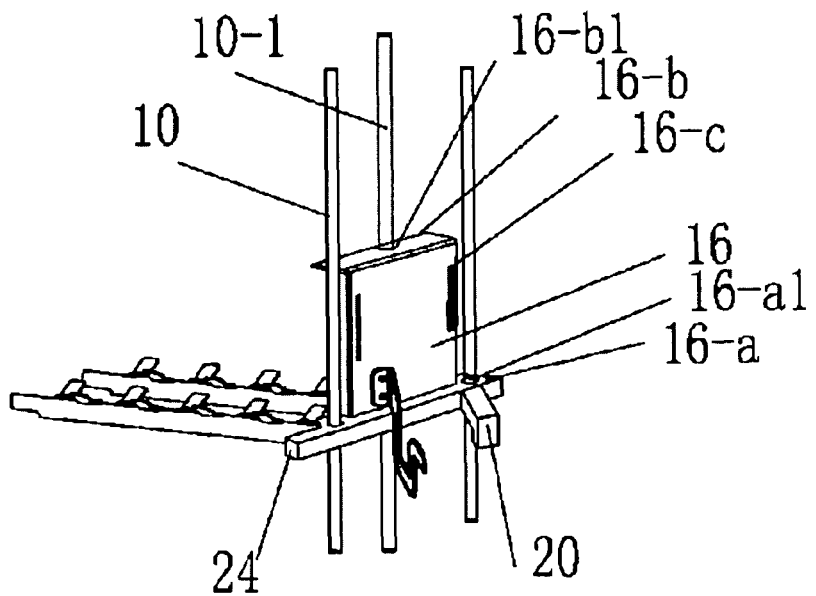
FIG. 5 is a schematic diagram of the first sliding member of the bread toaster according to the above first preferred embodiment of the present invention.

Referring to FIG. 1 to FIG. 5 of the drawings, a bread toaster according to a first preferred embodiment of the present invention is illustrated. The features of the preferred embodiment are described in details as follows.

1. The bread toaster comprises a lid arrangement which is arranged to be operated between a closed position and an opened position for closing and opening the toasting slots of the bread toaster. When a user wishes to toast a bread slice when the lid arrangement is at the closed position, he or she needs to operate a lid actuation handle 4 of a toaster base 1. After such actuation, a second sliding member 12 is arranged to depress the first sliding member 16 for operating the lid arrangement.

2. When a user wishes to toast a bread slice when the lid arrangement is at the opened position, he or she needs only to operate a toaster actuation handle 21 of a toaster base 1. After such actuation, only the first sliding member 16 of the toaster base 1 is depressed for actuating toasting operation of the bread toaster.

According to the preferred embodiment of the present invention, the bread toaster comprises an outer cover, a toaster base 1, a toaster frame 15 mounted on the toaster base 1, a first sliding member 16 provided on a predetermined side of the toaster frame 15, a second sliding member 12 also provided on the same predetermined side of the toaster frame 15, a first inductive device 14, a second inductive device 18, and a switch 19 provided in the toaster frame 15.

The bread toaster further comprises a first sliding guider 10 and a second sliding guider 10-1 mounted on the toaster frame 15, wherein the first sliding member 16 is slidably connected to the first and the second sliding guiders 10, 10-1, while the second sliding member 12 is slidably connected to the first sliding guider 10 only. The bread toaster further comprises a front supporting frame 11 and a rear supporting frame 11a provided at a front side and a rear side of the toaster frame 15, the lid arrangement, and a control circuitry 101.

The bread toaster further comprises a hanger frame 3, a second biasing member 8, a toaster actuation handle 4, a first and a second front guiding frame 6, 6a having inwardly bent end portions 6-1, 6a-1 respectively, a first and a second driving member 5, 5a having a corresponding upper end portion outwardly bent at substantially ninety degrees, and is arranged to couple with the corresponding inwardly bent end portion 6-1, 6a-1 of the first and the second front guiding frame 6, 6a respectively. The second inductive device 18 is provided with a second electromagnetic member 17 having a second hanging member 17-1, wherein the second hanging member 17-1 and the hanger frame 3 are aligned with each other so that the hanger frame 3 is adapted to couple with the second hanging member 17-1. Furthermore, the second biasing member 8 is positioned above a switch control 2 and is aligned with it.

The bread toaster further comprises a holding member 24 provided on the first sliding member 16, a first biasing member 20 also provided on the first sliding member 16, the toaster actuation handle 21, and a toasting frame 29 communicating with the toasting slots. The first inductive device 14 is provided with a first electromagnetic member 13 having a first hanging member 13-1, wherein the first hanging member 13-1 and the holding member 24 are aligned with each other so that the holding member 24 is adapted to couple with the first hanging member 13-1. Furthermore, the first biasing member 20 is positioned above a power switch 19 and is aligned with it. The power switch 19 comprises a switch resilient element 19-1 formed thereon.

The second sliding member 12 further has a second upper sliding connector 12-b and a second lower sliding connector 12-a provided at an upper and a lower portion thereof respectively, wherein each of the second upper sliding connector 12-b and the second lower sliding connector 12-a has a through hole 12-b1, 12-a1 formed thereon. On the other hand, the first sliding member 16 further has a first lower sliding connector 16-a having a connector hole 16-a1, wherein the first sliding guider 10 is mounted on the toaster frame 15 and is extended to penetrate these through holes 12-b1, 12-a1 and the connector hole 16-a1. The first sliding member 16 further has a first upper connector 16-b having a connector hole 16-b1, wherein the second sliding guider 10-1 is arranged to extend on the toaster frame 15 to penetrate the connector hole 16-b1. In other words, the first sliding member 16 is capable of sliding along the first sliding guider 10 and the second sliding guider 10-1, while the second sliding member 12 is also capable of sliding along the first sliding guider 10. The first and the second sliding guider 10, 10-1 are preferably embodied as a guiding shaft. The toaster frame 15 may comprise a plurality of first and the second sliding guiders 10, 10-1 according to different circumstances of operation.

The front supporting frame 11 is connected to the first and the second front guiding frame 6, 6a at lower ends 6-1, 6a-1 thereof, wherein the bread toaster further comprises a plurality of resilient elements 7, 7a mounted between a mid portion of the first and the second guiding frame 6, 6a and the front supporting frame 11. The rear supporting frame 11a is connected to a first and a second rear guiding frame 20, 20a, wherein the first front guiding frame 6 and the first rear guiding frame 20 are pivotally connected to a first lid member 9, while the second front guiding frame 6a and the second rear guiding frame 20a are pivotally connected to a second lid member 9a.

When the user wishes to toast the bread slice without using the lid arrangement, the user needs to depress the toaster actuation handle 21 which driven the first sliding member 16 to depress as well. The toasting frame 29 is connected to the first sliding member 16 so that when the first sliding member 16 is depressed, the toasting frame 29 is also depressed for depressing the bread slice 30 supported by the toasting frame 29. When the first sliding member 16 is depressed to the bottom portion of the toaster frame 15, the holding member 24 is moved downwardly to couple with the first hanging member 13-1 while the first biasing member 20 is driven to depress the switch resilient element 19-1 of the power switch 19 for activating the toasting process. At the same time, the first inductive device 14 is attracted by the first electromagnetic member 13 so as to allow the holding member 24 to be attracted by the first hanging member 13-1. As such, the first sliding member 16 is retained at the bottom portion of the toaster frame 15 for allowing toasting of the bread slice for a predetermined period of time.

When the user wishes to toast the bread slice with the help of the lid arrangement, the user needs to depress the lid actuation handle 4 of the second sliding member 12. When this happens, the second sliding member 12 is depressed to drive the first sliding member 16 to depress as well. This will also cause the toasting frame to move to the bottom portion of the toaster frame 15. When the first sliding member 16 is moved to the bottom portion of the toaster frame 15, the first and the second driving member 5, 5a are arranged to pivotally drive the first and a second front guiding frame 6, 6a to close the lid member 9, 9a respectively. When the first and the second lid member 9, 9a are pivotally moved to close the toasting slots, the holding member 24 of the first sliding member 16 is arranged to couple with the first hanging member 13-1 while the first biasing member 20 is driven to depress the switch resilient element 19-1 of the power switch 19 for activating the toasting process. At the same time, the hanger frame 3 is driven to couple with the second hanging member 17-1, while the second biasing member 8 is moved to bias against the switch control 2 for activating the control circuitry 101 which automatically adjusts the toasting time to correspond with a predetermined toasting time with the lid arrangement covering the toasting slots. At this time, the first inductive device 14 is attracted by the first electromagnetic member 13 so as to allow the holding member 24 to be attracted by the first hanging member 13-1. As such, the first sliding member 16 is retained at the bottom portion of the toaster frame 15 for allowing toasting of the bread slice for the corresponding predetermined period of time. Furthermore, the second inductive device 18 is arranged to generate attractive force for attracting the second hanging member 17-1 so as to retain the second sliding member 12 at the bottom portion of the toaster frame 15. This also retains the first and the second lid member 9, 9a to remain closed.

When the toasting time has passed, the control circuitry 101 is arranged to generate a signal for deactivating the second inductive device 18 so as to remove the attractive force. As such, the second sliding member 12 is subject to a resilient force to move upwardly along the toaster frame 15. When this happens, the second driving member 5, 5a and the first and a second front guiding frame 6 are pivotally moved by the resilient element 7, 7a to pivotally move the first and the second lid member 9, 9a for opening the toasting slots. Afterwards, the first inductive device 14 ceases to have the attractive force, the holding member 24 disengages from the first electromagnetic member 13 so as to allow the first sliding member 16 to move upwardly along the toaster frame 15 due to an upwardly urging force exerted by a resilient member 22. The upward movement of the first sliding member 16 brings the bread slice upwardly for user's retrieval.

Figure 6:
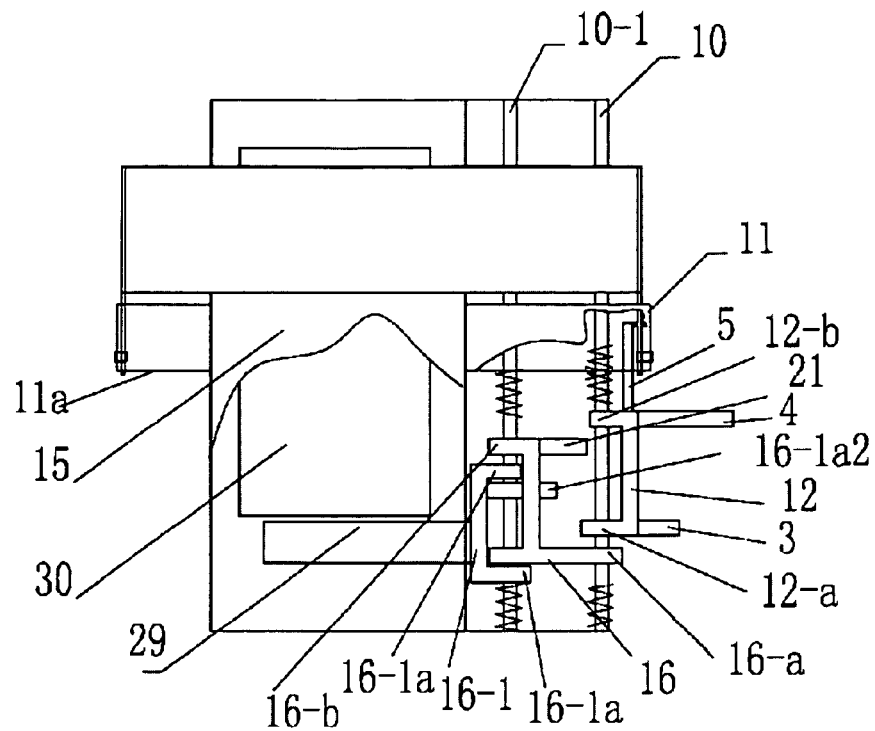
FIG. 6 is a side view of a bread toaster according to a second preferred embodiment of the present invention.
Figure 7:
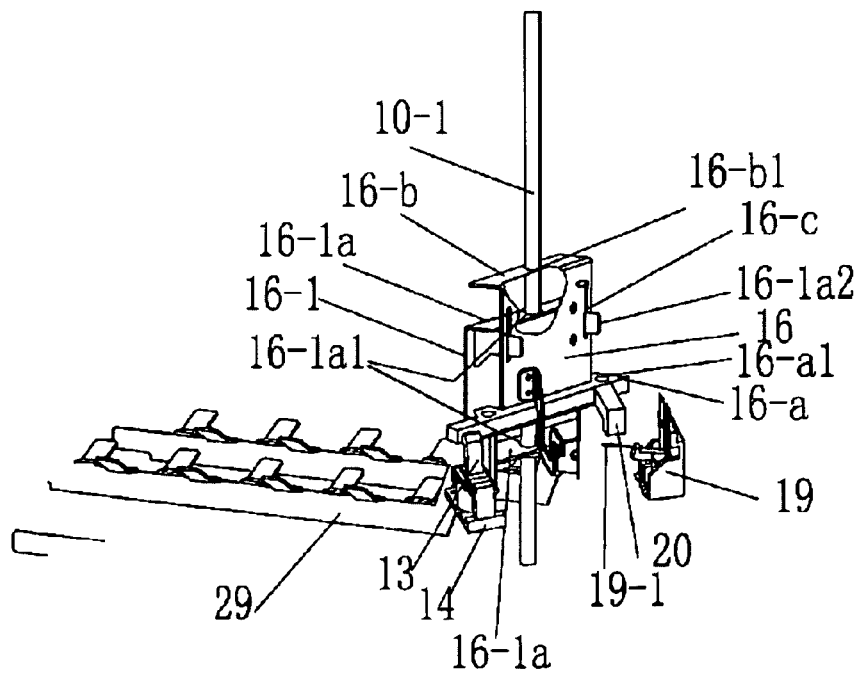
FIG. 7 is a first schematic diagram of the first sliding member and the third sliding member of the bread toaster according to the above second preferred embodiment of the present invention.
Figure 8:
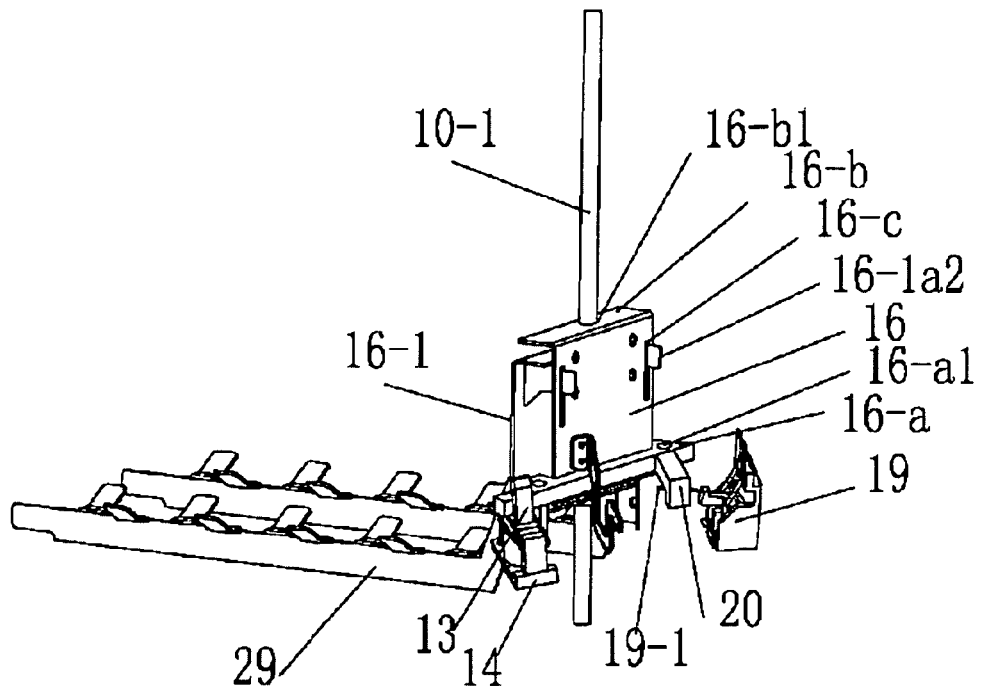
FIG. 8 is a second schematic diagram of the first sliding member and the third sliding member of the bread toaster according to the above second preferred embodiment of the present invention.

Referring to FIG. 6 to FIG. 8 of the drawings, a bread toaster according to a second preferred embodiment of the present invention is illustrated. The features of the second preferred embodiment are described in details as follows.

1. The bread toaster comprises a lid arrangement which is arranged to be operated between a closed position and an opened position for closing and opening the toasting slots of the bread toaster. When a user wishes to toast a bread slice when the lid arrangement is at the closed position, he or she needs to operate a lid actuation handle 4 of a toaster base 1. After such actuation, a second sliding member 12 is arranged to depress the first sliding member 16 and a third sliding member 16-1 for operating the lid arrangement. Furthermore, the first sliding member 16 and the third sliding member 16-1 are also utilized to move the bread slice in the toasting slots.

2. When a user wishes to toast a bread slice when the lid arrangement is at the opened position, he or she needs only to operate a toaster actuation handle 21 of a toaster base 1. After such actuation, only the first sliding member 16 and the third sliding member 16-1 are depressed for actuating toasting operation of the bread toaster. The second sliding member 12 remains unmoved. In other words, only the first sliding member 16 and the third sliding member 16-1 are utilized to move the bread slice in the toasting slots.

3. The difference between the second preferred embodiment and the first preferred embodiment is that the bread toaster further comprises a third sliding member 16-1.

According to the second preferred embodiment of the present invention, the bread toaster comprises an outer cover, a toaster base 1, a toaster frame 15 mounted on the toaster base 1, a first sliding member 16 provided on a predetermined side of the toaster frame 15, a second sliding member 12 also provided on the same predetermined side of the toaster frame 15, a third sliding member 16-1, a first inductive device 14, a second inductive device 18, and a switch 19 provided in the toaster frame 15, and a switch control 2. The bread toaster further comprises a first sliding guider 10 whereas the second sliding member 12 further has a second upper sliding connector 12-*b* and a second lower sliding connector 12-*a* provided at an upper and a lower portion thereof respectively, wherein each of the second upper sliding connector 12-*b* and the second lower sliding connector 12-*a* has a through hole 12-*b*1, 12-*a*1 formed thereon. On the other hand, the first sliding member 16 further has a first lower sliding connector 16-*a* having a connector hole 16-*a*1, and a first upper sliding connector 16-*b*, wherein the first sliding guider 10 is mounted on the toaster frame 15 and is extended to penetrate these through holes 12-*b*1, 12-*a*1 and the connector hole 16-*a*1. Furthermore, the third sliding member 16-1 further has a third upper connector 16-1*a* having a connector hole 16-1*a*1, wherein the second sliding guider 10-1 is arranged to extend on the toaster frame 15 to penetrate a connector hole 16-*b*1 of the first sliding member 16 and the connector hole 16-1*a*1 of the third sliding member 16-1. The bread toaster further comprises a toasting frame 29 communicating with the toasting slots. The first lower sliding connector 16-*a* is positioned below the second lower sliding connector 12-*a* of the second sliding member 12. Thus, the first sliding member 16 is capable of sliding along the first and the second sliding guider 10, 10-1. The second sliding member 12 is capable of sliding along the first sliding guider 10, while the third sliding member 16-1 is capable of slidably engaging with a sliding slot 16-*c* of the first sliding member 16 through a plurality of securing members 16-1*a*2. The first and the second sliding guider 10, 10-1 are embodied as two guiding shafts respectively.

Figure 9:
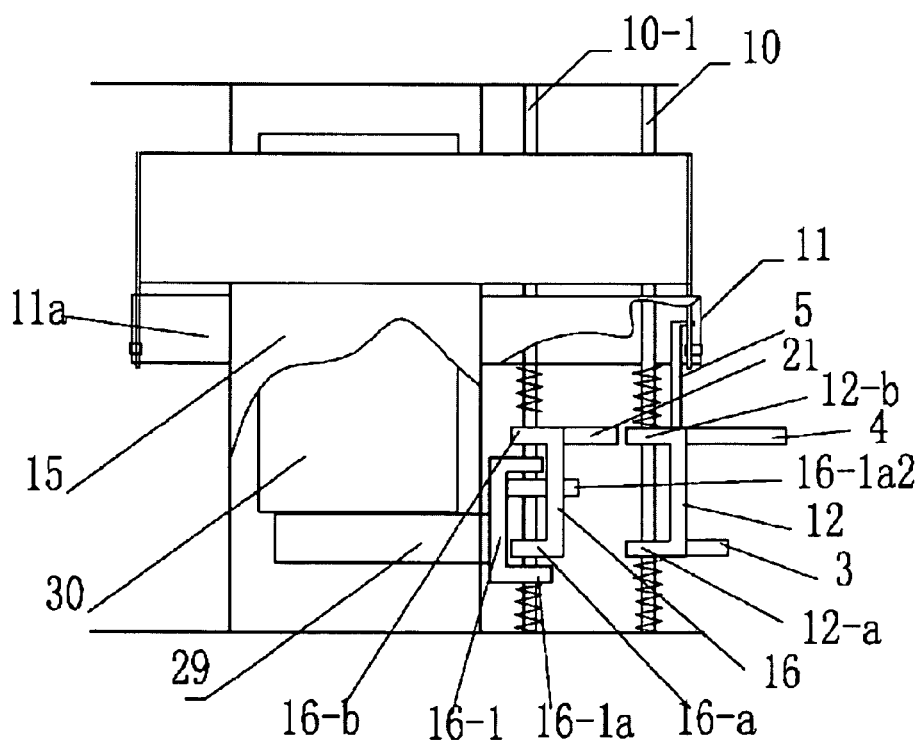
FIG. 9 is a side view of a bread toaster according to a third preferred embodiment of the present invention.
Figure 10:
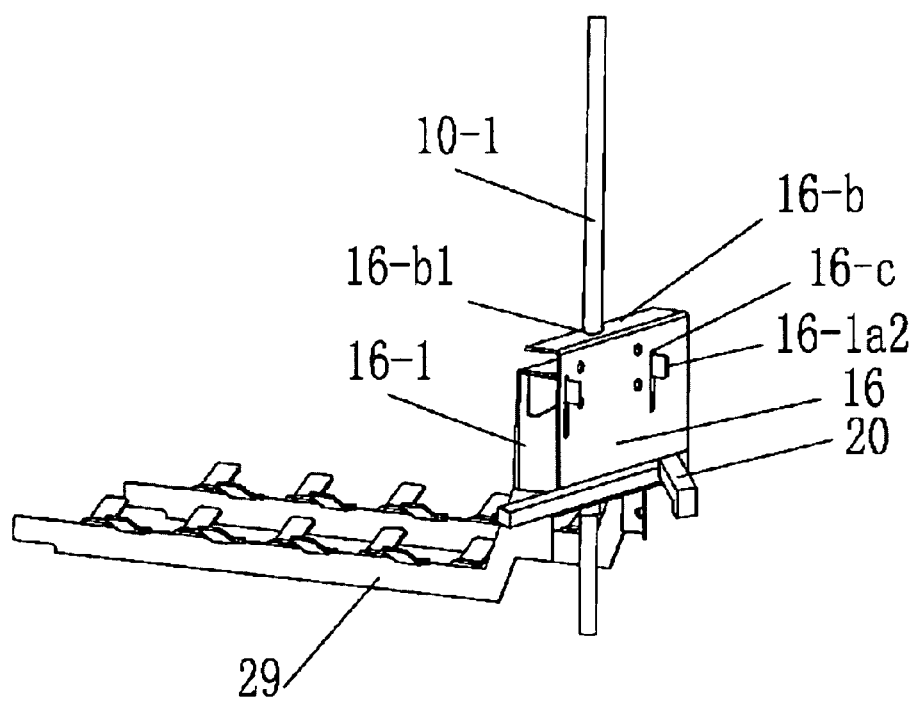
FIG. 10 is a schematic diagram of the first sliding member and the third sliding member of the bread toaster according to the above third preferred embodiment of the present invention.

Referring to FIG. 9 to FIG. 10 of the drawings, a bread toaster according to a third preferred embodiment of the present invention is illustrated. The features of the third preferred embodiment are described in details as follows.

1. The bread toaster comprises a lid arrangement which is arranged to be operated between a closed position and an opened position for closing and opening the toasting slots of the bread toaster. When a user wishes to toast a bread slice when the lid arrangement is at the closed position, he or she needs to operate a lid actuation handle 4 of a toaster base 1. After such actuation, a second sliding member 12 is depressed and the toasting process starts.

2. When a user wishes to toast a bread slice when the lid arrangement is at the opened position, he or she needs only to operate a toaster actuation handle 21 of a toaster base 1. After such actuation, only the first sliding member 16 and the third sliding member 16-1 are depressed for actuating toasting operation of the bread toaster.

3. The difference between the third preferred embodiment and the first preferred embodiment is that the bread toaster further comprises a third sliding member 16-1, and the second sliding member 12 and the first sliding member 16 are structural independent, while the third sliding member 16-1 is operatively coupled with the first sliding member 16.

According to the third preferred embodiment of the present invention, the bread toaster comprises an outer cover, a toaster base 1, a toaster frame 15 mounted on the toaster base 1, a first sliding member 16 provided on a predetermined side of the toaster frame 15, a second sliding member 12 also provided on the same predetermined side of the toaster frame 15, a third sliding member 16-1, a first inductive device 14, a second inductive device 18, and a switch 19 provided in the toaster frame 15, and a switch control 2. The bread toaster further comprises a first sliding guider 10 whereas the second sliding member 12 further has a second upper sliding connector 12-*b* and a second lower sliding connector 12-*a* provided at an upper and a lower portion thereof respectively, wherein each of the second upper sliding connector 12-*b* and the second lower sliding connector 12-*a* has a through hole 12-*b*1, 12-*a*1 formed thereon. The first sliding guider 10 is slidably mounted on the toaster frame 15 through penetrating the through hole 12-*b*, 12-*a*1 of the second sliding member 12. On the other hand, the first sliding member 16 further has a plurality of first sliding connectors 16-*b* each having a connector hole 16-*b*1 formed on an upper and a lower portion thereof, wherein the first sliding guider 10 is mounted on the toaster frame 15 and is extended to penetrate these connector holes 16-*b*1. Furthermore, the third sliding member 16-1 further has a plurality of third connectors 16-1*a* each having a third connector hole 16-1*a* 1, wherein the second sliding guider 10-1 is arranged to extend on the toaster frame 15 to penetrate the third connector holes 16-1*a*1 of the third sliding member 16-1. Thus, the first sliding member 16 and the third sliding member 16-1 are capable of sliding along the second sliding guider 10-1, while the second sliding frame 12 is capable of sliding along the first sliding guider 10. The bread toaster further comprises a toasting frame 29 communicating with the toasting slots. The third sliding member 16-1 is capable of slidably engaging with a sliding slot 16-*c* of the first sliding member 16 through a plurality of securing members 16-1*a*2. The first and the second sliding guider 10, 10-1 are embodied as two guiding shafts respectively.

Figure 11:
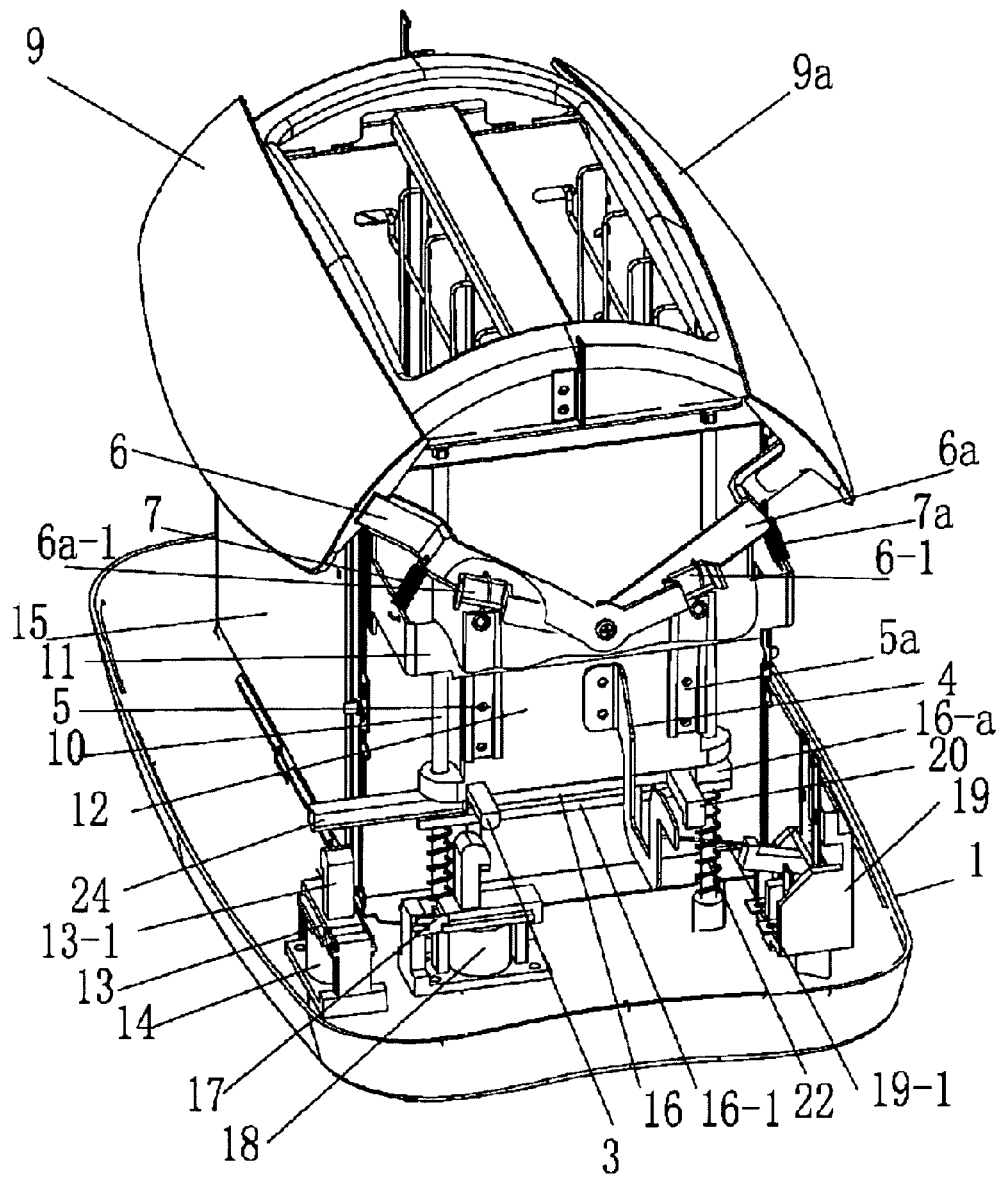
FIG. 11 is a perspective view of a bread toaster according to a fourth preferred embodiment of the present invention.
Figure 12:
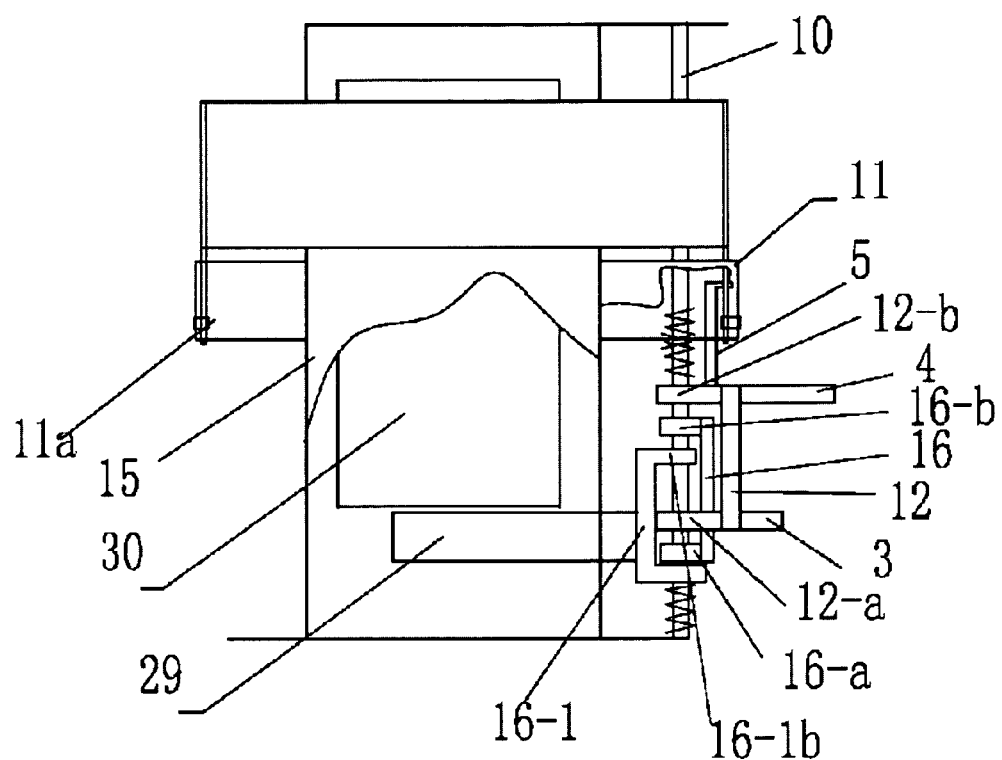
FIG. 12 is a schematic diagram of the first sliding member and the third sliding member of the bread toaster according to the above fourth preferred embodiment of the present invention.

Referring to FIG. 11 to FIG. 12 of the drawings, a bread toaster according to a fourth preferred embodiment of the present invention is illustrated. The features of the fourth preferred embodiment are described in details as follows.

1. The bread toaster comprises a lid arrangement which is arranged to be operated between a closed position and an opened position for closing and opening the toasting slots of the bread toaster. When a user wishes to toast a bread slice when the lid arrangement is at the closed position, he or she needs to operate a lid actuation handle 4 of a toaster base 1. After such actuation, a second sliding member 12 is arranged to depress the first sliding member 16 and a third sliding member 16-1 for operating the lid arrangement.

2. This particular preferred embodiment does not allow a user to toast a bread slice when the lid arrangement is at the opened position.

3. The differences between the third preferred embodiment and the first preferred embodiment are that (a) the first sliding member 16 does not have a handle, (b) the first sliding member 16 is slidably engaged with the third sliding member 16-1, (c) the third sliding member 16-1 has a securing member 16-1*a*2, and (d) there is no second sliding guider 10-1 present in this embodiment.

According to the fourth preferred embodiment of the present invention, the bread toaster comprises an outer cover, a toaster base 1, a toaster frame 15 mounted on the toaster base 1, a first sliding member 16 provided on a predetermined side of the toaster frame 15, a second sliding member 12 also provided on the same predetermined side of the toaster frame 15, a third sliding member 16-1, a first inductive device 14, a second inductive device 18, and a switch 19 provided in the toaster frame 15. The bread toaster further comprises a first sliding guider 10 whereas the second sliding member 12 further has a second upper sliding connector 12-*b* and a second lower sliding connector 12-*a* provided at an upper and a lower portion thereof respectively, wherein each of the second upper sliding connector 12-*b* and the second lower sliding connector 12-*a* has a through hole 12-*b*1, 12-*a*1 formed thereon. On the other hand, the first sliding member 16 further has a first lower sliding connector 16-*a* having a first connector hole 16-*a*1, and a first upper sliding connector 16-*b* also having a first connector hole 16-*b*1. Furthermore, the third sliding member 16-1 further has a third upper connector 16-1*a* having a third connector hole 16-1*a*1, wherein the first sliding guider 10 is mounted on the toaster frame 15 and is extended to penetrate these through holes 12-*b*1, 12-*a*1 and the first and the third connector holes 16-*b*1, 16-*a*1, 16-1*a*1. Furthermore, the first upper and the first lower sliding connector 16-*b*, 16-*a* are positioned below the second upper sliding connector 12-*b* and the second lower sliding connector 12-*a*. The third upper connectors 16-1*a* are positioned below the first upper and the first lower sliding connector 16-*b*, 16-*a*. The bread toaster further comprises a toasting frame 29 communicating with the toasting slots. Thus, the first sliding member 16 is capable of sliding along the first sliding guider 10. The second sliding member 12 and the third sliding member 16-1 are capable of sliding along the first sliding guider 10. The first sliding guider 10 is embodied as a guiding shaft.

Figure 13:
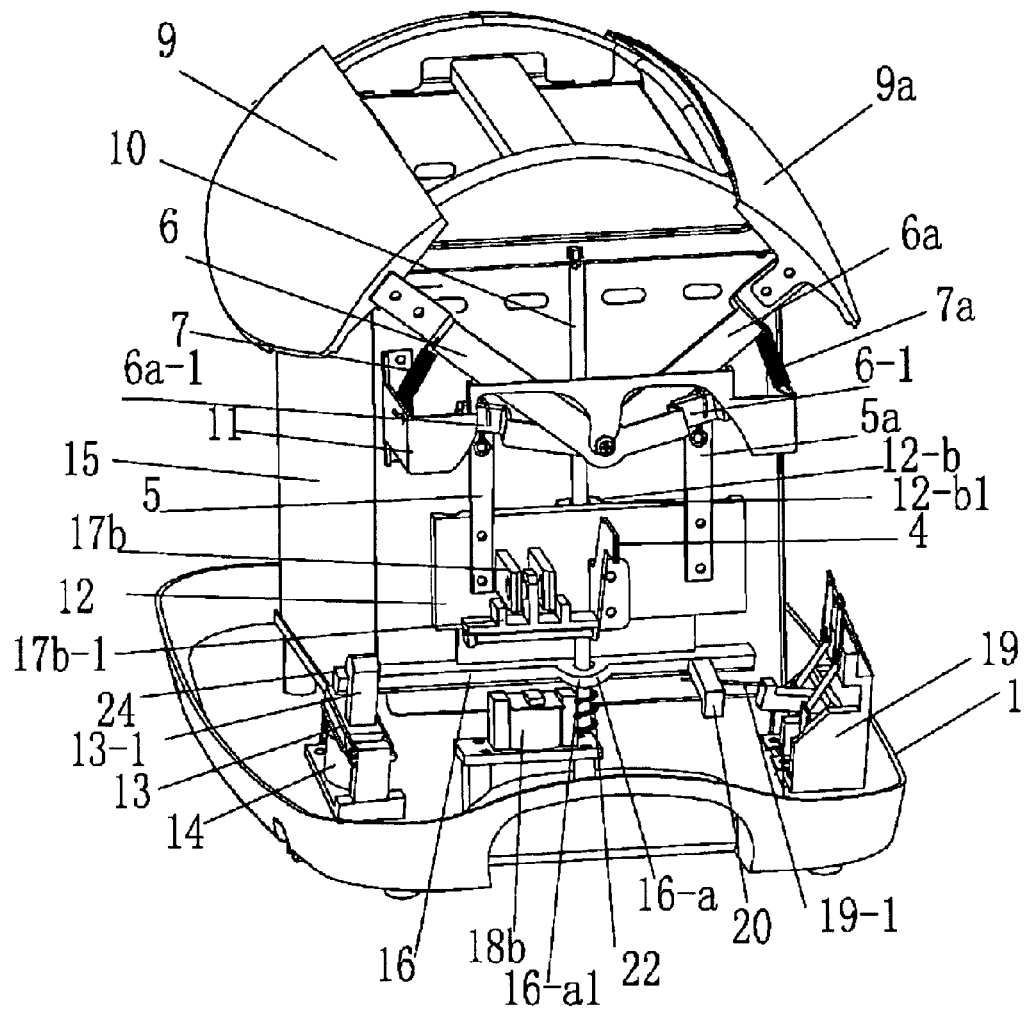
FIG. 13 is a perspective view of a bread toaster according to a fifth preferred embodiment of the present invention.
Figure 14:
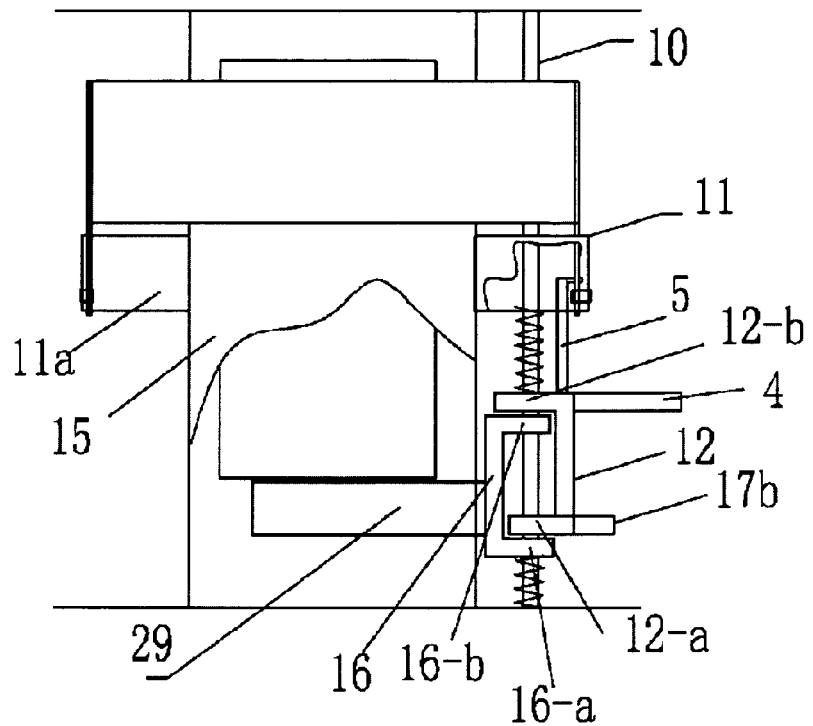
FIG. 14 is a side view of the bread toaster according to the above fifth preferred embodiment of the present invention.
Figure 15:
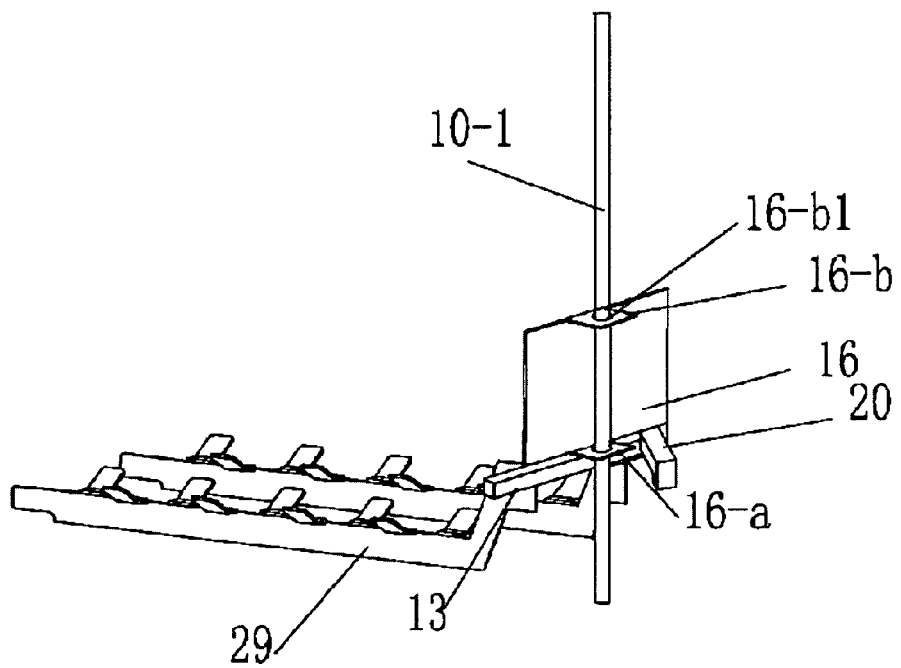
FIG. 15 is a schematic diagram of the first sliding member according to the above fifth preferred embodiment of the present invention.

Referring to FIG. 13 to FIG. 15 of the drawings, a bread toaster according to a fifth preferred embodiment of the present invention is illustrated. The features of the fifth preferred embodiment are described in details as follows.

1. The bread toaster comprises a lid arrangement which is arranged to be operated between a closed position and an opened position for closing and opening the toasting slots of the bread toaster. When a user wishes to toast a bread slice when the lid arrangement is at the closed position, he or she needs to operate a lid actuation handle 4 of a toaster base 1. After such actuation, a second sliding member 12 is arranged to depress the first sliding member 16 for operating the lid arrangement.

2. This particular preferred embodiment does not allow a user to toast a bread slice when the lid arrangement is at the opened position.

3. The differences between the third preferred embodiment and the first preferred embodiment are that (a) the first sliding member 16 does not have a handle, (b) the bread toaster comprises a hanger frame 3, an electromagnetic frame 17*b* having an electromagnetic member 17*b*-1, a second inductive device 18*b* aligned with the electromagnetic member 17*b*-1, wherein the second sliding member 12 is communicated with the electromagnetic frame 17, and (c) there is no first sliding guider 10 present in this embodiment.

According to the fifth preferred embodiment of the present invention, the bread toaster comprises an outer cover, a toaster base 1, a toaster frame 15 mounted on the toaster base 1, a first sliding member 16 provided on a predetermined side of the toaster frame 15, a second sliding member 12 also provided on the same predetermined side of the toaster frame 15, a first inductive device 14, a second inductive device 18*b*, and a switch 19 provided in the toaster frame 15. The bread toaster further comprises a second sliding guider 10-1 whereas the second sliding member 12 further has a second upper sliding connector 12-*b* and a second lower sliding connector 12-*a* provided at an upper and a lower portion thereof respectively, wherein each of the second upper sliding connector 12-*b* and the second lower sliding connector 12-*a* has a through hole 12-*b*1, 12-*a*1 formed thereon. On the other hand, the first sliding member 16 further has a first lower sliding connector 16-*a* having a first connector hole 16-*a*1, and a first upper sliding connector 16-*b* also having a first connector hole 16-*b*1. Furthermore, the first upper and the first lower sliding connector 16-*b*, 16-*a* are positioned below the second upper sliding connector 12-*b* and the second lower sliding connector 12-*a*. The bread toaster further comprises a toasting frame 29 communicating with the toasting slots. Thus, the first sliding member 16 and the second sliding member 12 are capable of sliding along the second sliding guider 10-1. The second sliding guider 10-1 is embodied as a guiding shaft.

The operation of the present invention is as follows.

1. When a user wishes to toast a bread slice when the lid arrangement is at the opened position.

As shown in FIG. 1 to FIG. 5 of the drawings, the mechanism for toasting the bread slice when the user wishes to toast the bread slice without using the lid arrangement (i.e. when the lid arrangement is at the opened position) has been mentioned above.

Referring to FIG. 6 to FIG. 10 of the drawings, when the bread toaster is electrically connected to an external power source, the user has to depress the toaster actuation handle 21 of the first sliding member 16 so as to allow the first sliding member 16 to move downwardly. At the same time, the first sliding member 16 drives the third sliding member 16-1 to depress as well so as to allow the toasting frame 29 to depress. When the toasting frame 29 has reached the bottom portion of the toaster frame 15, the holding member 24 will be moved to engage with the first hanging member 13-1. Moreover, the first biasing member 20 is driven to actuate the switch resilient element 19-1 of the power switch 19 for actuating the power switch to toast the bread slice. When the power switch 19 is actuated, the first inductive device 14 is arranged to attract the first electromagnetic member 13 so that the holding member 24 is maintained at the bottom position of the toaster frame by the first hanging member 13-1. Thus, the first sliding member 16 and the third sliding member 16-1 are retained at the bottom portion of the toaster frame 15. Toasting of the bread slice may now start.

Referring to FIG. 11 to FIG. 15 of the drawings, since the first sliding member 16 does not have a handle, the user cannot toast the bread slice without the lid arrangement covering the toasting slots.

2. When a user wishes to toast a bread slice when the lid arrangement is at the closed position.

Referring to FIG. 6 of the drawings, when the bread toaster is electrically connected to an external power source, the user has to depress the toaster actuation handle 21 of the second sliding member 12 so as to allow the second sliding member 12 to move downwardly. At the same time, the second sliding member 12 drives the third sliding member 16-1 to depress as well so as to allow the toasting frame 29 to depress. When the toasting frame 29 has reached the bottom portion of the toaster frame 15, the first and the second front guiding frame 6 and the first and the second driving member 5, 5*a* are pivotally moved to pivotally move the first and the second lid member 9, 9*a* to close the toasting slots. When the first and the second lid members 9, 9*a* are pivotally moved to close the toasting slots, the holding member 24 is moved to a position below the first hanging member 13-1 while the first biasing member 20 is moved to actuate the power switch 19. The first inductive device 14 is arranged to attract the first electromagnetic member 13 so that the holding member 24 is maintained at the bottom position of the toaster frame 15 by the first hanging member 13-1. Thus, the first sliding member 16 and the third sliding member 16-1 are retained at the bottom portion of the toaster frame 15. At this time, the second inductive device 18 and the second electromagnetic member 17 generate an attractive force for allowing the second hanging member 17-1 to engage with the hanger frame 3. This allows the lid members 9, 9a to be maintained at the closed position.

Referring to FIG. 9 of the drawings, when the bread toaster is electrically connected to an external power source, the user needs to depress the lid actuation handle 4 of the second sliding member 12. When this happens, the second sliding member 12 is depressed so as to allow the first and the second driving member 5, 5a to pivotally drive the first and a second front guiding frame 6, 6a to close the lid member 9, 9a respectively. When the first and the second lid member 9, 9a are pivotally moved to close the toasting slots, the hanger frame 3 is driven to couple with the second hanging member 17-1. At this time, if the first sliding member 16 is moved to actuate the switch 19, the second inductive device 18 is arranged to generate attractive force for attracting the second hanging member 17-1 to engage with the hanger frame 3 so as to retain the second sliding member 12 at the bottom portion of the toaster frame 15. This also retains the first and the second lid member 9, 9a to remain closed. It is worth mentioning that if the first sliding member 16 is not depressed by the user by using the toaster actuation handle 21, the second inductive device 18 will not be actuated to start toasting the bread slice.

The working principles of the bread toaster as shown in FIG. 11 to FIG. 12 are substantially the same as that shown in FIG. 6.

Referring to FIG. 13 to FIG. 15 of the drawings, when the bread toaster is electrically connected to an external power source, the user needs to depress the lid actuation handle 4 of the second sliding member 12. When this happens, the second sliding member 12 is depressed so as to depress the first sliding member 16 as well for allowing the toasting frame 29 to depress. When the toasting frame 29 has reached the bottom portion of the toaster frame 15, the first and the second driving member 5, 5a are arranged to pivotally drive the first and a second front guiding frame 6, 6a to close the lid member 9, 9a respectively. When the first and the second lid member 9, 9a are pivotally moved to close the toasting slots, the first inductive device 14 is attracted by the first electromagnetic member 13 so as to allow the holding member 24 to be attracted by the first hanging member 13-1. As such, the first sliding member 16 is retained at the bottom portion of the toaster frame 15 for allowing toasting of the bread slice for the corresponding predetermined period of time. Furthermore, the second inductive device 18 is arranged to generate attractive force for attracting the second hanging member 17-1 by the hanging frame 3 so as to retain the second sliding member 12 at the bottom portion of the toaster frame 15. This also retains the first and the second lid member 9, 9a to remain closed.

When the predetermined toasting time has passed:

Referring to FIG. 6 to FIG. 12 of the drawings, when the predetermined toasting time has passed, the control circuitry 101 is arranged to generate a signal for opening the lid arrangement. More specifically, the second inductive device 18 ceases to have the attractive force, the second hanging member 17-1 disengages from the second inductive device 18. The second sliding member 12 slides upwardly due to resilient force exerted by a resilient member. At the same time, the second driving member 5, 5a and the first and a second front guiding frame 6, 6a are pivotally moved by the resilient elements 7, 7a to pivotally move the lid members 9, 9a to the opened position. Afterwards, the first inductive device 14 ceases to have the attractive force, the first hanging member 13-1 disengages from the holding member 24, wherein the first sliding member 16 slides upwardly due to the resilient force exerted by the resilient member 22. The first sliding member 16 then moves the bread slice upwardly for user's retrieval.

It is worth mentioning that if the toasting frame 29 is accidentally stuck in the middle of the toaster frame 15, the third sliding member 16-1 is not capable of moving upwardly because the path is blocking by the securing member 16-1a2. At this time, the first biasing member 20 disengages from the switch resilient element 19-1 of the power switch 19 so that the heating element no longer generate heat for toasting the bread slice. As shown in FIG. 11 to FIG. 12, if the toasting frame 29 is accidentally stuck in the middle of the toaster frame 15, the third sliding member 16-1 is not capable of moving upwardly because the path is blocking by the second lower sliding connector 12-a and the third upper connector 16-1a. At this time, the first biasing member 20 disengages from the switch resilient element 19-1 of the power switch 19 so that the heating element no longer generate heat for toasting the bread slice.

Referring to FIG. 13 to FIG. 15 of the drawings, when the predetermined toasting time has passed, the control circuitry is arranged to generate a signal for opening the lid arrangement. More specifically, the second inductive device 18 ceases to have the attractive force, the second hanging member 17-1 disengages from the second inductive device 18. The second sliding member 12 slides upwardly due to resilient force exerted by a resilient member. At the same time, the second driving member 5, 5a and the first and a second front guiding frame 6, 6a are pivotally moved by the resilient elements 7, 7a to pivotally move the lid members 9, 9a to the opened position. Afterwards, the first inductive device 14 ceases to have the attractive force, the first hanging member 13-1 disengages from the holding member 24, wherein the first sliding member 16 slides upwardly due to the resilient force exerted by the resilient member 22. The first sliding member 16 then moves the bread slice upwardly for user's retrieval.

It is worth mentioning that if the toasting frame 29 is accidentally stuck in the middle of the toaster frame 15, the first sliding member 16 is not capable of moving upwardly. At this time, the first biasing member 20 disengages from the switch resilient element 19-1 of the power switch 19 so that the heating element no longer generate heat for toasting the bread slice.

Figure 16:
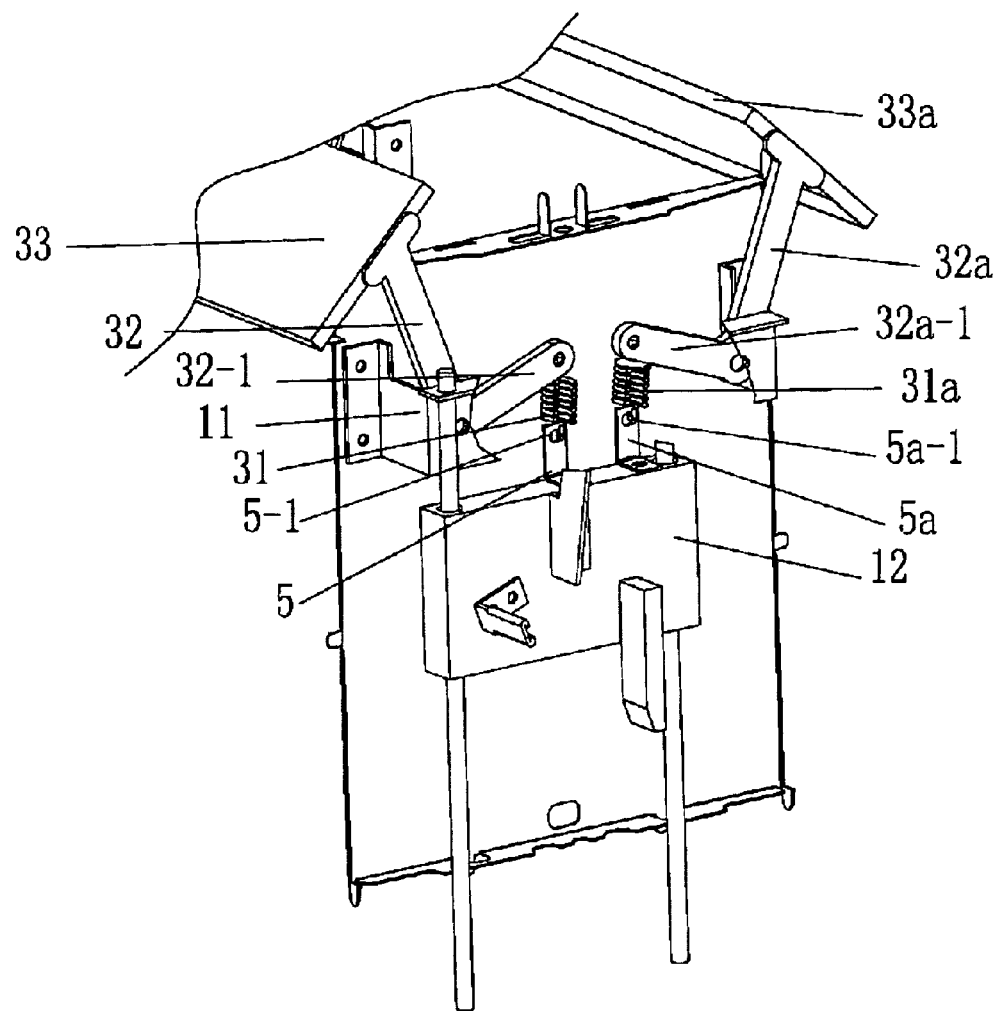
FIG. 16 is another schematic diagram of the bread toaster according to the above fifth preferred embodiment of the present invention.

Referring to FIG. 16 of the drawings, an alternative mode of the lid arrangement is illustrated. In this alternative mode, the lid arrangement comprises a first and a second front guiding frame 6, 6a pivotally mounted on the front supporting frame 11, and a first and a second lid member 33, 33a, wherein each of the first and the second driving member 5, 5a has a driving hole 5-1, 5a-1 formed thereon respectively. The lid arrangement further comprises a first and a second pivotal member 32, 32a each having an end portion 32-1, 32a-1, and a plurality of elastic member 31, 31a extended between the end portions 32-1, 32a-1 of the first and the second pivotal member 31, 31a and the first and the second lid member 33, 33a respectively.

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A bread toaster, comprising an outer cover, a toaster base, a toaster frame mounted on said toaster base, a first sliding member slidably provided on a predetermined side of said toaster frame, a second sliding member also provided on said same predetermined side of said toaster frame, a front supporting frame and a rear supporting frame provided at a front side and a rear side of said toaster frame respectively, a lid arrangement, a control circuitry, and a third sliding member communicated with said first sliding member for operating said lid arrangement, and a toasting frame mounted on said third sliding member for moving said bread slice in toasting slots, wherein said lid arrangement is arranged to be operated between a closed position and an opened position for closing and opening said toasting slots of said bread toaster, wherein said second sliding member further has a second upper sliding connector and a second lower sliding connector provided at an upper and a lower portion thereof respectively, wherein each of said second upper sliding connector and said second lower sliding connector has a through hole formed thereon, wherein said first sliding member further has a first lower sliding connector having a connector hole and a first upper sliding connector having a connector hole, wherein said first lower sliding connector and said first upper sliding connector are slidably coupled to a first sliding guider, wherein said first lower sliding connector and said first upper sliding connector are positioned below said second lower sliding connector and said second upper sliding connector of the second sliding member respectively.

2. The bread toaster, as recited in claim 1, wherein said third sliding member further has a third upper connector having a connector hole, wherein said second sliding guider is arranged to extend on said toaster frame to penetrate a connector hole of said first sliding member and said connector hole of said third sliding guider.

3. The bread toaster, as recited in claim 2, wherein said first sliding member is capable of sliding along said first and said second sliding guider, wherein said second sliding member is capable of sliding along said first sliding guider, while said third sliding member is capable of slidably engaging with a sliding slot of said first sliding member through a plurality of securing members.

4. The bread toaster, as recited in claim 3, further comprising a holding member provided on said first sliding member, a first biasing member provided on said first sliding member, wherein said first inductive device comprises a first electromagnetic member, wherein said first electromagnetic member and said first biasing member are aligned with each other.

5. The bread toaster, as recited in claim 2, wherein each of the said first sliding guider and said second sliding guider comprises a shaft.

6. A bread toaster, comprising an outer cover, a toaster base, a toaster frame mounted on said toaster base, a first sliding member slidably provided on a predetermined side of said toaster frame, a second sliding member also provided on said same predetermined side of said toaster frame, a front supporting frame and a rear supporting frame provided at a front side and a rear side of said toaster frame respectively, a lid arrangement, a control circuitry, a first sliding guider, a second sliding guider mounted on said toaster frame, a third sliding member communicated with said first sliding member for operating said lid arrangement, and a toasting frame mounted on said third sliding member for moving said bread slice in toasting slots, wherein said lid arrangement is arranged to be operated between a closed position and an opened position for closing and opening said toasting slots of said bread toaster, wherein said first sliding member is slidably connected to said first and said second sliding guider, wherein said first sliding member further has a first lower sliding connector having a connector hole, wherein said first sliding member further has a first upper connector having a connector hole, wherein said second sliding guider is arranged to connect with said first sliding member.

7. The bread toaster, as recited in claim 6, wherein said third sliding member further has a third upper connector having a connector hole, wherein said second sliding guider is arranged to extend on said toaster frame to penetrate a connector hole of said first sliding member and said connector hole of said third sliding guider.

8. The bread toaster, as recited in claim 7, wherein said first sliding member is capable of sliding along said first and said second sliding guider, wherein said second sliding member is capable of sliding along said first sliding guider, while said third sliding member is capable of slidably engaging with a sliding slot of said first sliding member through a plurality of securing members.

9. The bread toaster, as recited in claim 8, further comprising a holding member provided on said first sliding member, a first biasing member provided on said first sliding member, wherein said first inductive device comprises a first electromagnetic member, wherein said first electromagnetic member and said first biasing member are aligned with each other.

10. The bread toaster, as recited in claim 7, wherein each of the said first sliding guider and said second sliding guider comprises a shaft.

* * * * *